W. F. HUTCHINSON.
LAMP WORKING APPARATUS FOR VEHICLES.
APPLICATION FILED OCT. 30, 1908.
930,669.
Patented Aug. 10, 1909.
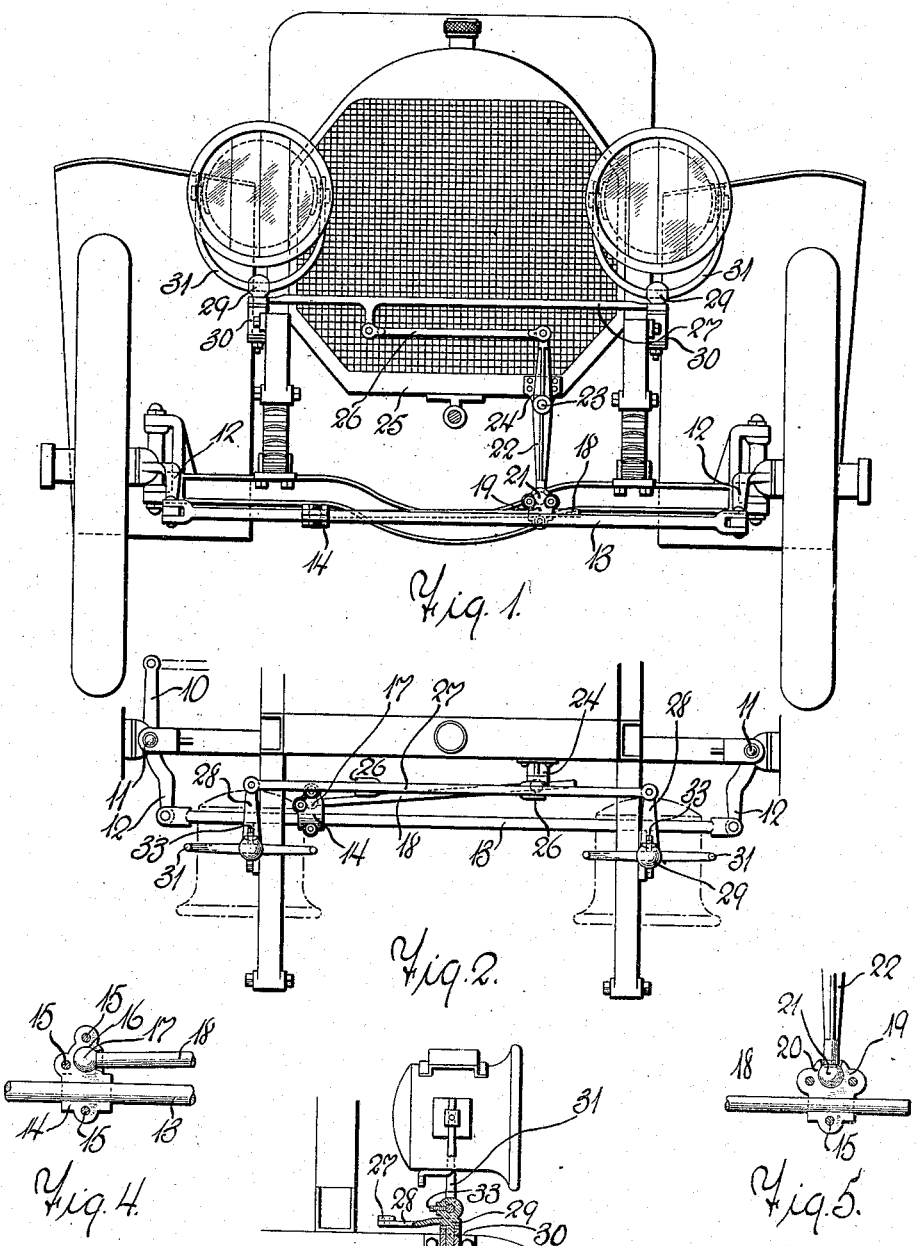

UNITED STATES PATENT OFFICE.

WILLIAM F. HUTCHINSON, OF NYACK, NEW YORK, ASSIGNOR OF ONE-HALF TO CHARLES A. TATUM, OF NEW YORK, N. Y.

LAMP-WORKING APPARATUS FOR VEHICLES.

No. 930,669.   Specification of Letters Patent.   Patented Aug. 10, 1909.

Application filed October 30, 1908. Serial No. 460,206.

*To all whom it may concern:*

Be it known that I, WILLIAM F. HUTCHINSON, of Nyack, Rockland county, New York, have invented a new and useful Improvement in Lamp-Working Apparatus for Vehicles, of which the following is a full, clear, and exact description.

My invention relates to improvements in apparatus for operating the head lights of vehicles, and especially the head lights of automobiles, although the apparatus can be used in connection with any wheeled vehicle employing such lights.

Usually automobiles have the lamps mounted in a fixed relation to the body so that in rounding a corner, the wheels will be running in one direction while the lamps point straight ahead of the body, and so the light is not in the right place. Various attempts have been made to provide mechanism for having the lamps turn automatically with the wheels and in the same direction, but these attempts have not been very successful, largely for the reason that the working apparatus lacks adaptability and adjustability, and the racking and up and down movements of the car body have had a tendency to displace the working mechanism and render it inoperative.

The object of my invention is to produce a simple apparatus which will operate automatically by the steering of the car, which will always hold the lamps in such relation to the wheels that the light will be thrown in the direction of the travel of the wheels, which will adapt itself to all irregularities of the movement of the car, and especially to the up and down movement of the springs, and which is positive in action, simple in construction, and adapted to fulfil the requirements of always throwing the light in the direction that the wheels are steered.

Reference is to be had to the accompanying drawings forming a part of this specification, in which similar reference characters indicate corresponding parts in all the views.

Figure 1 is a front elevation of an automobile provided with my improved apparatus. Fig. 2 is a plan view of the apparatus, showing its application to a vehicle such as an automobile. Fig. 3 is a detail sectional elevation showing especially how a lamp is mounted, turned and adjusted. Fig. 4 is a detail of one of the joints of the apparatus, and Fig. 5 is a detail of a second joint of the apparatus.

The car can be of any usual construction, and can be an automobile or any wheeled vehicle. As illustrated the steering gear is shown having an arm 10 connected with one of the steering knuckles and adapted to be turned by the usual steering wheel. The steering knuckle 11 has also forwardly extending arms 12 which are connected together by a rod 15 so that both knuckles and front wheels will be turned in unison. It will be quite obvious that this arrangement described is common to cars, and that it is only common to certain makes of cars, but it will also be understood that cars generally have the arms 12 and the connecting part 13, though these are sometimes arranged differently from what they are in the drawings. On the connecting rod 13 of the steering arms 12, is secured a clamp 14 which is made up of two parts so as to be readily attached and adjusted when the two parts are held together by suitable bolts 15. The upper part of the clamp 14 is formed into a cup 16 which receives a ball 17 on the end of a pitman 18, and this is connected to a second clamp 19 which is similar in construction to the clamp 14 already referred to. It will be seen that the clamps can both be readily adjusted, one being adjustable on the rod 13 and the other on the pitman 18, so that the two parts can be easily made to fit any ordinary automobile or similar vehicle. The second clamp 19 has a cup 20 formed in the side, which serves as a seat for the ball 21 on the lower end of a lever 22 which is arranged vertically and is fulcrumed as shown at 23 on a bracket 24 attached to the radiator frame 25 of the vehicle, but it will of course be understood that this lever 22 can be supported in any convenient way.

The upper end of the lever 22 connects by a pitman 26 with a cross rod 27, and this connects two similar cranks 28 on opposite sides of the vehicle, each crank being attached to a vertical pin 29 which turns in a bearing 30 vertically arranged and supported on the frame of the machine or some other convenient part thereof. The pin 29 turns dust tight in the bearing 30, and the bearing portion of the pin can be suitably oiled. Each pin 29 has an enlarged head which serves as a support for the lamp bracket 31, which is of U shape, and is adapted to support a lamp as usual. An important feature of the manner in which the lamp is supported, is that the bracket 31 is held against oscillation by the set screw 33, so that the brackets can be tilted in a way to cause the lamps to project their rays relatively far in advance or near to the vehicle.

It will be seen that I have made a very simple and positive connection between the steering mechanism of the wheel and the oscillating lamp brackets, by which any movement of the wheel laterally is transferred to the lamps which are correspondingly moved. Obviously the arrangement could be made to move one lamp instead of two, but it is better to have both move.

I wish to call special attention to the fact that the ball joints interposed between the connecting rod 13 and the lever 22, provide for perfect adjustment, and they also provide for any racking or vertical movement of the vehicle so that no matter how rough the road, the lamp operating mechanism is not strained or broken; further, the arrangement which I have described makes the attachment easily applied to vehicles of different kinds.

It is obvious that some of the details of construction may be changed or modified, and that the application of the connecting parts will have to be modified somewhat to meet the variations in form of the steering mechanism of automobiles or similar cars, but the essential thing is to arrange the lamp brackets in oscillating bearings as shown to provide for tilting the lamps to the desired angle and make an operative connection between the steering mechanism and the lamp brackets, which connection is provided with joints allowing for any irregular or unusual movements of the vehicle.

Having thus fully described my invention, I claim as new and desire to secure by Letters Patent:—

1. The combination with a wheeled vehicle and its steering mechanism, of lamp brackets held to oscillate in their bearings, a tilting vertically arranged lever on the vehicle, a connecting rod extending from the upper end of the lever and operatively connected to one of the lamp brackets to turn it in its bearings, a pitman adjustably connecting the lower end of the lever with a movable part of the steering mechanism, and an operative connection between the lamp brackets to cause them to turn in unison.

2. The combination with a wheeled vehicle and its steering mechanism, of lamp brackets held to oscillate in their bearings and supporting the lamps so that they may be tilted on horizontal axes, a connecting rod connecting the two lamp brackets so that they turn in unison, a tilting lever on the vehicle, a connecting rod extending from the upper end of the lever to the aforesaid lamp bracket rod, and a pitman connecting by universal joints and extending from the lower end of the lever to a reciprocating part of the steering mechanism.

WILLIAM F. HUTCHINSON.

Witnesses:
WARREN B. HUTCHINSON,
M. G. O'DONNELL.